United States Patent [19]
Wolf et al.

[11] 3,911,047
[45] Oct. 7, 1975

[54] SHAPED STRUCTURES MADE OF ACRYLONITRILE POLYMERS WITH ANTISTATIC ADDITIVES

[75] Inventors: Gerhard Dieter Wolf, Dormagen; Francis Bentz, Cologne; Gunther Nischk, Dormagen, all of Germany

[73] Assignee: Bayer Aktiengesellschaft, Leverkusen-Bayerwerk, Germany

[22] Filed: Oct. 18, 1974

[21] Appl. No.: 516,132

[30] Foreign Application Priority Data
Oct. 24, 1973 Germany............................ 2353213

[52] U.S. Cl.. 260/859 R; 260/77.5 CR; 260/85.5 S; 260/88.7 B
[51] Int. Cl.² .................................. C08G 41/04
[58] Field of Search .................................. 260/859

[56] References Cited
UNITED STATES PATENTS
3,038,876  6/1962  Farago ........................ 260/859 R
3,380,953  4/1968  Fukushima ..................... 260/859 R FOREIGN PATENTS OR APPLICATIONS
9,430    12/1955  Germany
45-2771  1/1970   Japan............................ 260/859
45-2772  1/1970   Japan............................ 260/859
46-0659  1/1971   Japan............................ 260/859

*Primary Examiner*—Paul Lieberman
*Attorney, Agent, or Firm*—Plumley & Tyner

[57] ABSTRACT

The invention relates to shaped articles, especially filaments, fibres and foils of acrylonitrile polymers containing as antistatic additives polyether polyurethanes of the general formula $$R-NHCO-(OCH_2CH_2)_n-A-(CH_2CH_2O)_n-[CO-HN-R'-NHCO-(OCH_2-CH_2)_n-A-(CH_2CH_2O)_n]_p-OCNH-R$$

4 Claims, No Drawings

SHAPED STRUCTURES MADE OF ACRYLONITRILE POLYMERS WITH ANTISTATIC ADDITIVES

This invention relates to shaped structures, e.g. filaments, fibres and foils, of acrylonitrile polymers which have been rendered permanently antistatic by the addition of certain polyether polyurethane compounds.

Shaped structures made of synthetic polymers, e.g. polyacrylonitrile fibres, generally have the disadvantage of becoming electrically charged, which limits their range of application. This unwanted build-up of electric charge occurs when the surface resistance of the fibres is more than $10^{12}\Omega$.

Attempts have been made to reduce the electrostatic charge, for example by means of a surface treatment of the fibres, or of the textile products produced from them, with antistatic dressings which increase the electrical conductivity. The thus-obtained antistatic effect, however, is only slight, and, in most cases, it is not resistant to washing.

According to other known processes, an antistatic finish may be obtained by applying aqueous solutions of suitable substance to the fibres while they are in the aquagel state (see German Offenlegungsschrift Nos. 1,469,913 and 1,965,631). In these processes, however, considerable difficulties arise in maintaining the particular operating conditions.

It is also known to mix polyacrylonitrile, for example with a second acrylonitrile polymer which contains from 30 to 80 %, by weight, of a polyethylene oxide methacrylate and then to spin this mixture (see German Offenlegungsschrift No. 1,645,532). In general, however, the processes which involve increasing the electrical conductivity by copolymerising suitable co-monomers have the disadvantage that they often substantially alter the desirable properties of the particular polymers.

In other processes frequently employed for reducing the static charge of shaped structures of synthetic polymers, polyethers or other suitable compounds are added to the solutions or solvent-free melts of these polymers before they are shaped. It is very difficult, however, to find compounds of this kind which will, on the one hand, be wash-resistant, i. e. which will not be removed from fibres of such polymers even by repeated washing with alkaline detergents, and which will, on the other hand, be compatible with the polymers. If a portion of the additives is removed by washing, socalled "vacuoles" are formed and the fibres lose their glossy appearance and become mat owing to this "Soil-Hiding-Effect".

Polyethers, and many compounds which contain polyether linkages, have the additional disadvantage of reducing the light-fastness of polymers to which they are added.

It has now surprisingly been found that the use of compounds which contain both polyether linkages and urethane groups impart wash-resistant, i. e. permanent antistatic properties, to polyacrylonitrile fibres without reducing the light-fastness of these polymers. This is all the more surprising in view of the known fact that urethane groups which are adjacent to a polyether linkage are susceptible to hydrolysis.

The urethane group containing polyethers of the present invention exhibit several advantages: In addition to their excellent compatibility with the polymers, these additives impart excellent permanent antistatic characteristics to polyacrylonitrile fibres. Vacuoles, which are normally caused by additives, are not produced by these urethane group containing polyethers and, lastly, no yellowing of the fibres is observed.

The present invention therefore relates to shaped structures of acrylonitrile polymers containing as antistatic additives from 0.5 to 15 %, by weight, based on the total mixture, of at least one polyether polyurethane compound of the general formula R—NHCO—(OCH$_2$CH$_2$)$_n$—A—(CH$_2$—CH$_2$O)$_n$—[C-OHN—R'—NHCO—(OCH$_2$CH$_2$)$_n$—A—(CH$_2$C-H$_2$O)$_n$—]$_p$—OCNH—R in which
A denotes a bivalent radical of an aromatic biphenol of the formula

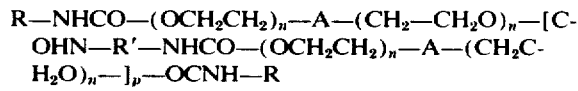

in which
R'' denotes a bivalent aromatic radical consisting of one or more condensed aromatic rings or of aromatic rings which are jointed together by a single bond or by a bridge member selected from the group consisting of —O—, —S—, —SO$_2$—, —CH$_2$—, —CHCH$_3$—, —C(CH$_3$)$_2$—, and

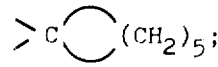

or
it denotes a bivalent five-, six- or seven-membered heterocyclic radical which contains at least two nitrogen atoms and which is linked in the polyether chain by two nitrogen atoms;
R denotes a C$_1$-C$_{18}$ alkyl, cycloalkyl, aralkyl, or alkaryl radical, and of which radicals may be substituted by halogen or alkyl;
R' denotes an alkylene, cycloalkylene, arylene, aralkylene or alkarylene radical, any of which radicals may be substituted by halogen or alkyl;
n denotes an integer of from 5 to 50; and
p denotes O or an integer of from 1 to 10.

The shaped structures according to the present invention may be obtained by adding from 0.5 to 15 %, by weight, based on the polymer mixture, of one or more polyether polyurethane compounds corresponding to the above general formula to solutions of the acrylonitrile polymers. The solvent is then removed in a process which is accompanied by shaping.

The term "shaped structures" includes threads, fibres and foils.

The polyether polyurethane compounds are preferably added in a quantity of from 2 to 10 %, by weight, based on the polymer mixture.

The compounds included in the group of acrylonitrile polymers are, particularly, polyacrylonitrile or copolymers of acrylonitrile with (meth)-acrylic acid esters, e.g. methyl and ethyl esters of acrylic and methacrylic acid; with (meth)-acrylamides, e.g. (meth)-acrylamide and N,N-dimethyl-(meth)-acrylamide; with N-vinyl lactams, e.g. N-vinyl pyrrolidone; with vinyl esters or ethers and (meth)-allyl esters or ethers; with vinyl or vinylidene halides, e.g. vinyl or vinylidene chloride and bromide; with alkyl vinyl pyridine, e.g. N-vinyl-4- methyl pyridine; with vinyl imidazoles; with (mono)-dialkylaminoalkyl acrylates and methacrylates, e.g. dimethylaminoethyl (meth)-acrylate and their quaternised derivatives; with vinyl and (meth)-allyl sulphonic acids; and with vinyl and (meth)-allyl phosphonic acids or their esters. All of these copolymers should contain at least 60 %, by weight, of acrylonitrile in a copolymerised form.

The polyether polyurethane compounds of the above general formula may be prepared by known processes as follows:

Bisphenols or five-, six- or seven-membered heterocyclic rings, containing at least two > NH-groups, are polyethoxylated, preferably as solvent-free melts, but, if desired, as solutions in an inert solvent and, if necessary, also under pressure in an autoclave in the presence of a catalytic quantity of a strong base, e.g. sodium or potassium hydroxide or sodium or potassium methanolate. The degree of ethoxylation may be varied as desired. After determination of their OH-number or molecular weight, the resulting polyether diols, containing aromatic or heterocyclic structures, are reacted in a stoichiometric excess, with a diisocyanate. This reaction may be carried out in the presence of an inert solvent, (for example, dimethylformamide), but preferably it is carried out without solvent, at temperatures of from 20° to 150°C. preferably from 80° to 130°C. The reaction is accompanied by the formation of urethane groups. The resulting polyether polyurethane precondensates, containing hydroxyl end groups, are then reacted with a monoisocyanate in a molar ratio of 1 : 2, again preferably without solvent, at temperatures of up to 150°C, preferably after first determining the OH-number. The reaction time is from 1 to 6 hours.

The chain length of the pre-condensates and hence also of the polyether polyurethanes depends mainly on two factors:

a. the molecular weight of the polyether diol used, containing aromatic or heterocyclic groups, and b. the molar ratio in which the polyether diols and diisocyanates are reacted.

The polyether polyurethane compounds vary from waxy to solid substances which are invariably soluble in dimethylformamide, in some cases mild heating is necessary.

Any conceivable bisphenols may, in principle, be used in the preparation of the polyether polyurethanes of the present invention, but it is preferred to use those bisphenols which have a melting point below approximately 170°C. This is because they may be ethoxylated as solvent-free melts, for example 2,2-bis-(4-hydroxyphenyl)-propane, (bisphenol A, Mp.: from 153° to 156°C). Bisphenols which have a higher melting point may be dissolved or suspended in an inert solvent, (for example, dioxane, tetrahydrofuran or dimethylformamide), and, if necessary, ethoxylated under pressure. The following bisphenols are mentioned as examples: hydroquinone, resorcinol, 4-chlororesorcinol, pyrocatechol, 1,5-dihydroxy naphthalene, 1,6-dihydroxy napthalene, 1,7-dihydroxy napthalene, 2,6-dehydroxy napthalene, 2,7-dihydroxy naphthalene, bis-(4-hydroxyphenyl)-sulphone, 4,4'-dihydroxy-biphenyl, 1,1-bis-(4-hydroxyphenyl)-ethane, 2,2-bis-(4-hydroxyphenyl)-propane, 2,2-bis-(3,5-dichloro-4-hydroxyphenyl)-propane, 1,1-bis-(4-hydroxyphenyl)-cyclohexane and bis-(2-hydroxy-1-naphthyl)-methane.

The heterocyclic compounds used in the preparation of the compounds of the present invention may be any compounds with five-, six- or seven-membered heterocyclic rings which contain at least two > NH-groups, e.g. piperazine, 2,5-dimethyl piperazine and imidazolidines. It is preferred to use those heterocyclic compounds in which at least one, but preferably both > NH-groups are adjacent to carbonyl groups, for example imidazolidone-2-, diketopiperazine, 3,6-dioxo-1,2,3,6-tetrahydropiperazine, hydantoins, uracils, quinazoline-2,4-diones or tetrahydroquinazolones-(4).

Ethoxylation of these heterocyclic compounds is preferably carried out in a solvent-free system, provided that the melting point of the compounds is below approximately 180°C. Compounds with higher melting points may be dissolved or suspended in an inert solvent, (e.g. tetrahydrofuran, dioxane or dimethylformamide) and, if necessary, ethoxylated under pressure.

There are in principle no limits to the degree of ethoxylation of the polyether diols, containing aromatic or heterocyclic groups, but, for the purposes of the present invention, polyether diols with molecular weights of from 500 to 3000 are preferred.

Particularly suitable diisocyanates for preparing the polyether polyurethanes of the present invention include cyclohexane-1,4-diisocyanate, 1-isocyanatomethyl-5-isocyanato-1,3,3-trimethyl-cyclohexane, phenylene-1,3-diisocyanate, phenylene-1,4-diisocyanate, tolylene-2,4-diisocyanate, tolylene-2,5-diisocyanate, naphthylene-1,5-diisocyanate, diphenylmethane-4,4'-diisocyanate, 2,2-bis-(4-isocyanatophenyl)-propane and mixtures thereof. Numerous other diisocyanates are also suitable.

Any monoisocyanates are suitable, in principle, but long-chain aliphatic and cycloaliphatic isocyanates which contain from 6 to 18 carbon atoms, e. g. stearyl isocyanates and cyclohexyl isocyanate, have been found to be particularly suitable, and it is also advantageous to use aromatic isocyanates, e.g. phenyl or naphthyl isocyanate.

The polyether polyurethanes of the present invention may be added to the spinning solution of the acrylonitrile polymer, either in the solid form or as solutions in dimethylformamide, in quantities of from 0.5 to 15 %, by weight, preferably from 2 to 10 %, by weight, based on the polymer mixture. If the synthesis of the additives is carried out e.g. in dimethylformamide, the required quantity of this solution of additives may be added directly to the spinning solution.

The surface resistance of the shaped structures of the present invention, in particular fibres as indicated in the Examples, was determined using a commercial high-resistance ohmeter, between two electrode plates 1 cm apart at a measuring voltage of 100 V, according to the proposed standard test DIN 54 345. Before each determination, the fibres were first conditioned for 72 hours in a standard atmosphere of 50 % relative humidity at 23°C. Under these conditions, the fibres produced according to the invention have an electrical surface resistance of from $5 \times 10^9$ to $10^{11}$ $\Omega$.

The fibres according to the invention may be dyed with the conventional dyes without any detrimental effect on the excellent anti-electrostatic character. These fibres are particularly advantageous in cases where subsequent antistatic treatment would otherwise be necessary, for example in curtain material. When employed in this manner, the material is not found to attract any dust due to static electricity produced by friction nor are there any sticky dressings to hold the dust.

The following Examples are to further illustrate the invention without limiting it.

EXAMPLE 1

Preparation and antistatic action of the polyether polyurethane which has the following average formula:

$$C_{18}H_{37}-NHCO-(OCH_2CH_2)_{\sim 20}-O-\langle\text{Ar}\rangle-C(CH_3)_2-\langle\text{Ar}\rangle-O-(CH_2CH_2O)_{\sim 20}-COHN-\langle\text{Ar}\rangle-CH_2-\langle\text{Ar}\rangle-\Big[$$

$$\Big[-NHCO-(OCH_2-CH_2)_{\sim 20}-O-\langle\text{Ar}\rangle-C(CH_3)_2-\langle\text{Ar}\rangle-O-(CH_2CH_2O)_{\sim 20}-COHN-C_{18}H_{37}$$

28.5 parts, by weight, 4,4'-diisocyanatodiphenylmethane were added portionwise, at approximately 100°C to 131 parts, by weight, a polyethoxylated bisphenol A which had an average molecular weight (MW) of 1920. After 3 hours' stirring at a temperature of from 100° to 130°C, 20.2 parts, by weight, stearyl isocyanate were added dropwise. The mixture was again stirred at 130°C and lastly a 25 % solution was prepared by the addition of 480 parts, by weight, dimethylformamide. The solution of the resulting polyether polyurethane was used, together with an acrylonitrile copolymer, to prepare an approximately 29 % dimethylformamide solution containing 92.5 %, by weight, of the copolymer and 7.5 %, by weight, of the polyether polyurethane. (The acrylonitrile copolymer used in this, as well as in all the following examples, was a copolymer of 93 % acrylonitrile, 6 % methyl acrylate and approximately 1 % methallyl sulphonate with a K-value of 81 (according to Fikentscher)). This solution had a viscosity of approximately 240 poise (85°C) and was spun into threads by the dry-spinning process. Titre of the fibres 3.3 dtex. The fibres had a tensile strength of 3.2 g/dtex at 12 % elongation. The anti-electrostatic action of the additive was determined by measuring the surface resistance of the fibres at 23°C and 50 % relative humidity as described above. Fresh (unbleached white): $3 \times 10^{10}$ Ω; sample after 10 washings: $5 \times 10^{10}$ Ω.

Since the acrylonitrile copolymer used contained an acidic additive, the fibres could be dyed with a basic dye, Colour Index No. 11,085, by the conventional methods used for acrylic fibres. When the surface resistance was then again determined, it was found to be $6 \times 10^{10}$ Ω. This shows that dyeing does not reduce the antistatic action. Even after repeated washing, the surface resistance of the dyed fibres was still found to be $6 \times 10^{10}$ Ω.

EXAMPLE 2

Preparation and antistatic action of $$C_{18}H_{37}-NHCO\Big[-(OCH_2CH_2)_{\sim 20}-O-\langle\text{Ar}\rangle-C(CH_3)_2-\langle\text{Ar}\rangle-O-(CH_2CH_2O)_{\sim 20}-COHN-\langle\text{Ar}\rangle-CH_2-\langle\text{Ar}\rangle-NHCO-\Big]_2$$

$$\Big[-(OCH_2-CH_2)_{\sim 20}-O-\langle\text{Ar}\rangle-C(CH_3)_2-\langle\text{Ar}\rangle-O-(CH_2CH_2O)_{\sim 20}-COHN-C_{18}H_{37}$$

11.7 parts, by weight, 4,4'-diisocyanatodiphenylmethane were added dropwise at a temperature of from 80° to 100°C to 134.5 parts, by weight, of the polyethoxylated bisphenol A, ME = 1920. After 4 hours' stirring at from 120° to 130°C, 13.8 parts, by weight, stearyl isocyanate were added dropwise and the mixture was then stirred for 4 hours at 130°C.

The above polyether polyurethane and the acrylonitrile copolymer, described in Example 1, were used to prepare a 29 % dimethylformamide solution which contained 90 %, by weight, of the acrylonitrile copolymer and 10 % by weight, of the polyether polyurethane. Filaments spun from this solution were found to have a good surface conductivity sufficient for practical purposes. Surface resistance: $9 \times 10^9$ Ω; after 10 washings: $2 \times 10^{10}$ Ω.

EXAMPLE 3

A dimethylformamide solution of the acrylonitrile copolymer, as described in Example 1, containing 7 %, by weight, based on the total solids content, of the polyether polyurethane, as described in Example 2, was spun to threads. Titre: 3.3 dtex, tensile strength: 3.5 g/dtex at 15 % elongation. The following results were obtained from determinations of the surface resistance: $3 \times 10^{10}$ Ω: after 10 washings; $8 \times 10^{10}$ Ω.

EXAMPLE 4

Preparation and antistatic action of the polyether polyurethane having the following average formula:

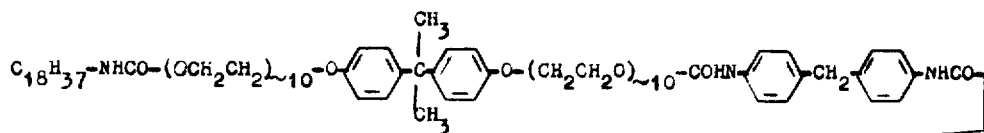
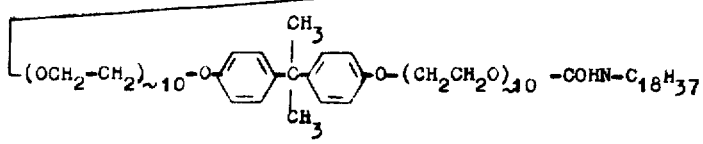

13.1 parts, by weight, 4,4'-diisocyanatodiphenylmethane were added, at approximately 100°C, to a solution of 116 parts, by weight, of a polyethoxylated bisphenol A, average molecular weight 1100 in 480 parts, by weight, DMF. The reaction mixture was then stirred for 6 hours at from 126° to 130°C. 30.9 parts, by weight, stearyl isocyanate were then introduced dropwise and the reaction mixture was stirred for 8 hours at 130°C.

Fibres spun from an approximately 29 % solution of a mixture of 90 % , by weight, of the acrylonitrile copolymer from Example 1 and 10 %, by weight, of the above-mentioned polyether polyurethane had a satisfactory surface conductivity. Surface resistance of fresh fibres: 5 × $10^{10}$ Ω; after 10 washings: 1 × $10^{11}$ Ω.

EXAMPLE 5

Preparation and antistatic action of

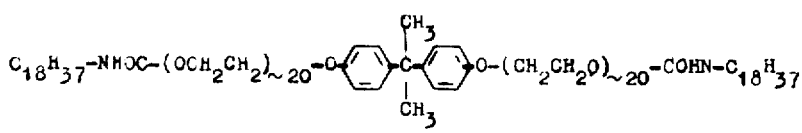

35.5 parts, by weight, stearyl isocyanate were added to 122.5 parts, by weight, of the polyethoxylated bisphenol A, average molecular weight 1920, and this reaction mixture was then stirred for 4 hours at from 120° to 130°C. Fibres spun from an approximately 25 % solution of a mixture of 90 parts, by weight, of the acrylonitrile copolymer from Example 1 and 10 %, by weight, of the compound described above had good antistatic characteristics. Surface resistance: 8 × $10^9$ Ω (fresh fibres); after 10 washings: 1 × $10^{10}$ Ω. After these fibres had been dyed with a basic dye (C.I. 11 085), they were found to have a surface resistance of 3 × 10Ω which was not altered by further washings.

EXAMPLE 6

Preparation and antistatic action of a polyether polyurethane of the following average formula:

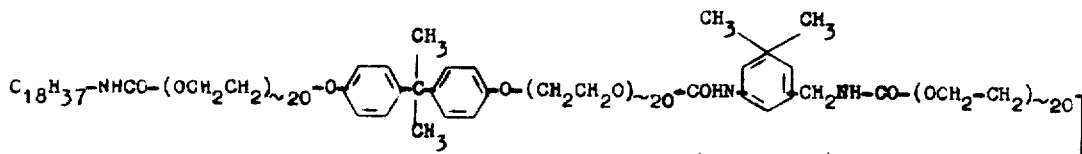
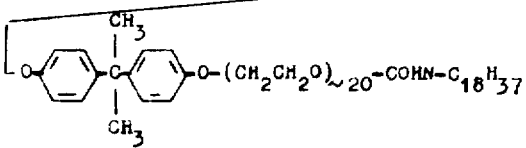

7.7 parts, by weight, 1-isocyanatomethyl-3-isocyanato-3,5,5-trimethyl cyclohexane were slowly added, at from 80° to 100°C, to 132 parts, by weight, of the ethoxylated bisphenol A, average molecular weight of 1920. The mixture was then stirred for 4 hours at from 120° to 130°C. 20.4 parts, by weight, stearyl isocyanate were then added dropwise and the mixture was stirred for a further 4 hours at 130°C. Fibres spun from an approximately 29 % solution of a mixture of 90 %, by weight, of the acrylonitrile copolymer described in Example 1 and 10 %, by weight, of the above compound had a good surface conductivity. Surface resistance: Fresh fibres $1 \times 10^{10}$ Ω; after 10 washings: $4 \times 10^{10}$ Ω.

EXAMPLE 7

A 29 % DMF solution was prepared from the polyether polyurethane described in Example 6. The solution contained 94 %, by weight, of the acrylonitrile copolymer described in Example 1 and 6 %, by weight, of the polyether polyurethane. Filaments spun from this solution had a surface resistance of $4 \times 10^{10}$ Ω (fresh fibres) and $9 \times 10^{10}$ Ω (after 10 washings).

EXAMPLES 8–11

In the following four Examples, instead of using the polyethoxylated bisphenol A compounds described in the previous Examples, 5,5-dimethyl hydantoin ethoxylated in the 1- and 3-positions was reacted in certain proportions with 4,4'-diisocyanatodiphenylmethane and subsequently with stearyl isocyanate. The reaction products obtained were polyether polyurethanes which contained hydantoin as represented by the following general equation. Their antistatic action in threads produced from polyacrylonitrile copolymers is summarised in the Table.

EXAMPLE 12

Preparation and antistatic action of a polyether polyurethane having the following general formula:

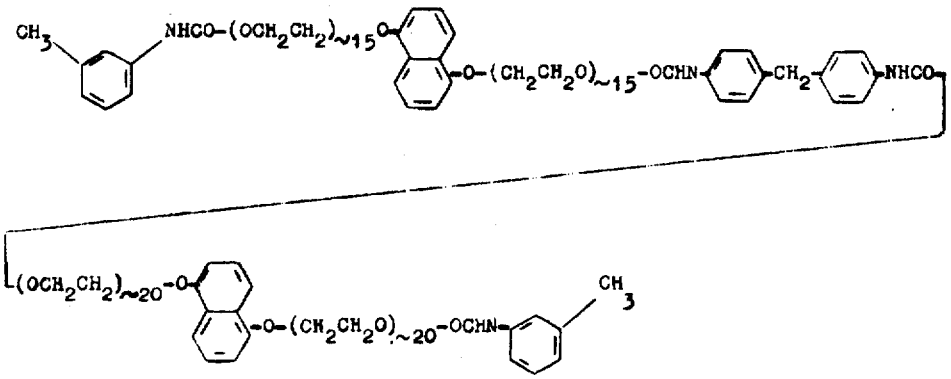

11.8 parts, by weight, 4,4'-diisocyanatodiphenylmethane were added at approximately 100°C, to a solution of 136 parts, by weight, polyethoxylated 1,5-dihydroxy-naphthalene, average molecular weight of 1480 in 480 parts, by weight, DMF. After stirring for several hours, 12.3 parts, by weight, m-tolyl isocyanate were added. The reaction mixture was then stirred for 6 hours at 130°C.

Fibres spun from an approximately 29 % solution of a mixture of 90 %, by weight, of acrylonitrile copolymer from Example 1 and 10 %, by weight, of the polyether polyurethane described above had a good surface conductivity. Surface resistance: Fresh fibres $2 \times 10^{10}$ Ω; after 10 washings $8 \times 10^{10}$ Ω.

EXAMPLE 13

Preparation and antistatic action of a polyether polyurethane having the following general formula:

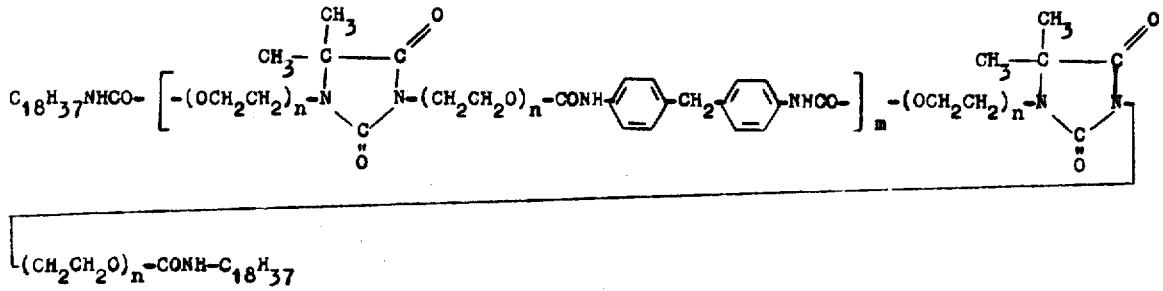

| Examples | m | n | Quantity of additive in % by weight | Surface resistance in fresh sample | after 3 washings | after dyeing and 3 washings |
|---|---|---|---|---|---|---|
| 8  | 2 | 15 | 10.0 | $1 \times 10^8$ | $3 \times 10^{10}$ | $5 \times 10^9$ |
| 9  | 2 | 15 | 7.5  | $3 \times 10^8$ | $8 \times 10^{10}$ | $2 \times 10^{10}$ |
| 10 | 2 | 8  | 10.0 | $4 \times 10^8$ | $5 \times 10^{10}$ | $9 \times 10^9$ |
| 11 | 4 | 8  | 10.0 | $6 \times 10^8$ | $2 \times 10^{10}$ | $1 \times 10^{10}$ |

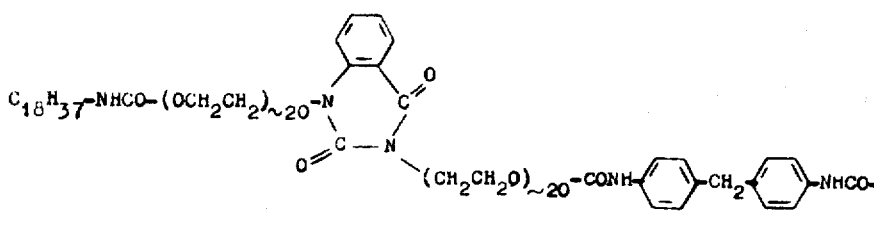

28.6 parts, by weight, 4,4'-diisocyanatodiphenylmethane were added portionwise to 131.3 parts, by weight, of a quinazoline-2,4-dione, polyethoxylated in the 1- and 3-positions and average molecular weight of 1920. Following this addition, the reaction mixture was stirred for 5 hours at 130°C and 20.2 parts, by weight, stearyl isocyanate were then added dropwise. The reaction mixture was then stirred for 5 hours at 130°C. Threads of acrylontrile copolymer containing approximately 10 90, by weight, of this antistatic agent have the following surface resistance: Fresh threads $9 \times 10^9$ Ω; after 10 washings: $6 \times 10^{10}$ Ω.

EXAMPLE 14

Preparation and antistatic action of a polyether polyurethane having the following general formula:

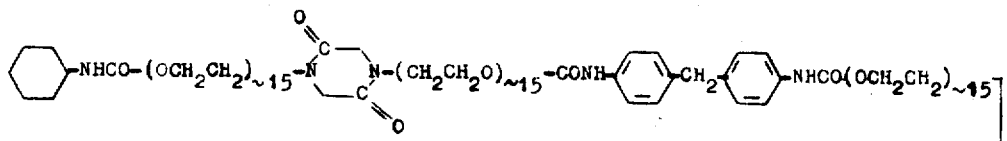

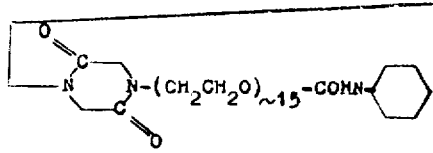

11.9 parts, by weight, 4,4'-diisocyanatodiphenylmethane were added, at approximately 130°C, to 136 parts, by weight, of a polyethoxylated diketopiperazine, average molecular weight of 1430. The mixture was then stirred for several hours at 130°C and 11.9 parts, by weight, cyclohexyl isocyanate were then added. The mixture was then stirred for a further 5 hours at approximately 130°C. Acrylonitrile copolymer threads which contained approximately 10 %, by weight, of the polyether polyurethane described above had the following surface resistances: Fresh threads $1 \times 10^{10}$ Ω; after 10 washings: $9 \times 10^{10}$ Ω.

We claim:

1. A shaped structure of an acrylonitrile polymer containing at least 60% by wieght acrylonitrile and containing as an antistatic additive from 0.5 to 15 %, by weight, based on the total mixture, of at least one polyether polyurethane compound of the general formula R—NHCO—(OCH$_2$CH$_2$)$_n$—A—(CH$_2$CH$_2$O)$_n$—[CO-HN—R'—NHCO—(OCH$_2$—CH$_2$)$_n$—A—(CH$_2$C-H$_2$O)$_n$]$_p$—OCNH—R in which A denotes a bivalent radical of an aromatic biphenol of the formula

—O—R''—O— in which

R'' denotes a bivalent aromatic radical consisting of one or more condensed aromatic rings or of aromatic rings which are joined together by a single bond or by a bridge member selected from the group consisting of —O—, —S—, —SO$_2$—, —CH$_2$—, —CHCH$_3$—, —C(CH$_3$)$_2$—and

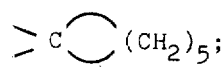

or it denotes a bivalent five-, six- or seven-membered heterocyclic radical which contains at least two nitrogen atoms and which is linked in the polyether chain by two nitrogen atoms:

R denotes a C$_1$-C$_{18}$ alkyl, cycloalkyl, aralkyl or alkaryl radical, any of which radical may be substituted by halogen or alkyl;

R' denotes an alkylene, cycloalkylene, arylene, aralkylene or alkarylene radical, any of which radicals may be substituted by halogen or alkyl;

n denotes an integer of from 5 to 50; and $p$ denotes 0 or an integer of from 1 to 10.
2. The shaped structure of claim 1, wherein in the general formula the bivalent radical R' is
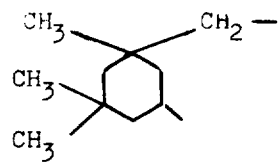
3. The shaped structure of claim 1, wherein in the general formula the bivalent radical R' is
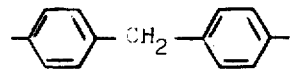
4. The shaped structure of claim 1, wherein in the general formula the bivalent radical R' is
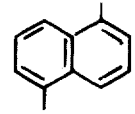
* * * * *